J. A. SCHMITT.
LOCKING DEVICE FOR THE CONTROLLING LEVERS OF MOTOR VEHICLES.
APPLICATION FILED MAR. 29, 1915.

1,169,572. Patented Jan. 25, 1916.

Witnesses
S. W. Brainard.
M. A. Collopy.

Inventor
Joseph A. Schmitt.
By John A. Bommhardt
Attorney

UNITED STATES PATENT OFFICE.

JOSEPH A. SCHMITT, OF SOUTH NEWBURG, OHIO.

LOCKING DEVICE FOR THE CONTROLLING-LEVERS OF MOTOR-VEHICLES.

1,169,572.  Specification of Letters Patent.  Patented Jan. 25, 1916.

Application filed March 29, 1915. Serial No. 17,680.

*To all whom it may concern:*

Be it known that I, JOSEPH A. SCHMITT, citizen of the United States, residing at South Newburg, in the county of Cuyahoga and State of Ohio, have invented certain new and useful Improvements in Locking Devices for the Controlling-Levers of Motor-Vehicles, of which the following is a specification.

This invention relates to locking devices for the controlling levers of motor vehicles, and has for its object to provide a simple and cheap device by means of which controlling levers may be locked to the steering wheel in such position that they cannot be moved, the locking being effected by means of an ordinary padlock.

The device also includes means for preventing the removal of the steering wheel from the steering post, which would otherwise permit the steering wheel to be dismounted and the locking device disengaged from the controlling levers.

The device can be readily carried in the pocket and applied to the wheel when desired.

Figure 1:
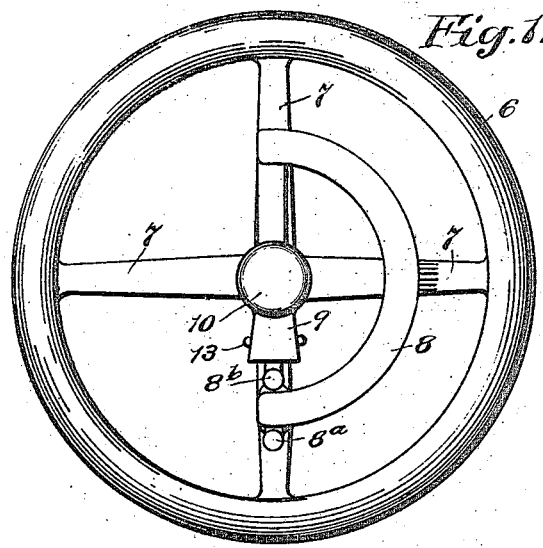
Figure 2:
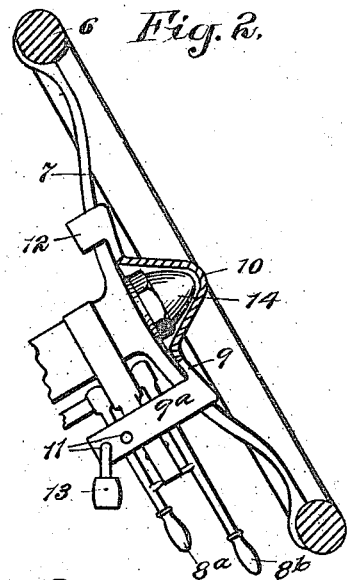
Figure 3:
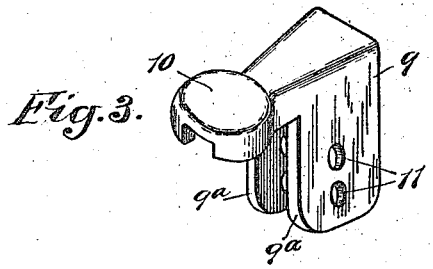
Figure 4:
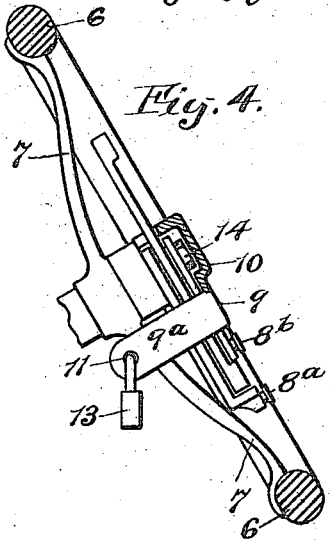
Figure 5:
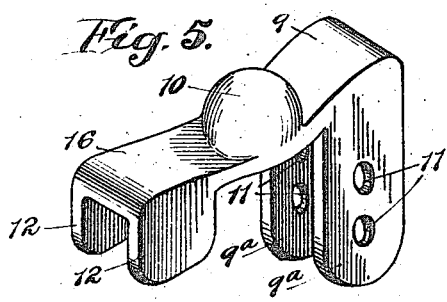

In the accompanying drawings, Figure 1 is a top view of a steering wheel with the locking device applied thereto. Fig. 2 is a side elevation, partly in section, of a modification. Fig. 3 is a perspective view of the locking device shown in Fig. 1. Fig. 4 is a sectional view of the same applied to the wheel. Fig. 5 is a perspective view of the vice shown in Fig. 2.

Referring specifically to the drawings, 6 indicates the wheel rim and 7 the arms or spider thereof. In the form shown in Figs. 1, 3 and 4 the locking member consists of a body or plate 9 having two depending ears 9ª which are spaced apart a proper distance to pass over one of the arms 7 of the wheel and also to embrace therebetween the spark and throttle control levers 8ª and 8ᵇ. As shown in Fig. 4, in one type of wheel these levers are located above or outside of the wheel spider, and the ears 9ª are long enough to inclose therebetween the two levers when they are alined with each other, as well as one of the arms 7 of the spider. At one end the plate 9 has a cap 10 which covers or incloses the nut 14 by which the wheel is fastened to the steering post, and so prevents the removal of the said nut and also prevents the locking device being moved out of locking position. The ears 9ª have one or more holes 11 to receive the shackle of a padlock 13. When the locking device is applied in the manner shown and described the levers 8ª and 8ᵇ cannot be moved with respect to the segment 8, and consequently operation of the machine is prevented.

In the form shown in Figs. 2 and 5 in which the levers 8ª and 8ᵇ are located under the wheel, the locking plate, in addition to the cap 10 which covers the nut 14, has an extension 16 provided with depending lugs 12 which extend over or embrace an opposite arm 7 of the steering wheel, the device when applied serving to prevent movement of the control levers in the same manner as above indicated.

What I claim as new is:

1. A locking device for the control levers of motor vehicles, comprising a plate having depending ears adapted to embrace therebetween said levers and the arm of a steering wheel, said ears having holes to receive a lock, and said plate having a cap adapted to fit over a nut at the center of the steering wheel.

2. A locking device for the control levers of an automobile, comprising a plate having a cap to receive the central nut of a steering wheel, and also having depending ears adapted to embrace said levers and the arm of the wheel, said ears having openings to receive the shackle of a padlock or the like.

In testimony whereof, I affix my signature in presence of two witnesses.

JOSEPH A. SCHMITT.

Witnesses:
JOHN A. BOMMHARDT,
J. B. DAVIS.

Copies of this patent may be obtained for five cents each, by addressing the "Commissioner of Patents, Washington, D. C."